(12) United States Patent
Marlhe et al.

(10) Patent No.: US 6,948,416 B2
(45) Date of Patent: Sep. 27, 2005

(54) METHOD FOR DETERMINING A BRAKE BOOSTER AMPLIFICATION

(75) Inventors: Nicolas Marlhe, Sevran (FR); Christophe Leboube, Roissy en Brie (FR)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 10/489,939

(22) PCT Filed: Oct. 9, 2002

(86) PCT No.: PCT/FR02/03065

§ 371 (c)(1),
(2), (4) Date: Mar. 17, 2004

(87) PCT Pub. No.: WO03/024760

PCT Pub. Date: Mar. 27, 2003

(65) Prior Publication Data

US 2004/0254708 A1 Dec. 16, 2004

(30) Foreign Application Priority Data

Sep. 20, 2001 (FR) .............................. 01 12173

(51) Int. Cl.[7] .............................................. B60T 13/52
(52) U.S. Cl. ..................................... 91/376 R; 303/155
(58) Field of Search ...................... 91/376 R; 303/155; 701/70, 78

(56) References Cited

U.S. PATENT DOCUMENTS

| 4,934,249 | A | * | 6/1990 | Gautier et al. | ............. 91/369.3 |
| 5,967,628 | A | * | 10/1999 | Abe et al. | ............. 303/122.12 |
| 6,234,589 | B1 | * | 5/2001 | Yoshida | ..................... 303/157 |
| 6,289,271 | B1 | * | 9/2001 | Isono et al. | ............ 303/122.12 |

* cited by examiner

Primary Examiner—Thomas E. Lazo
(74) Attorney, Agent, or Firm—Lea H. McCormick, Jr.; Warren Comstock

(57) ABSTRACT

The invention relates to a process and a device for determining the instantaneous value of the amplification provided by a pneumatic-assistance servomotor (14) in a braking device for a motor vehicle, wherein instantaneous values of the relative vacuum level inside the negative-pressure chamber (24) of the servomotor and of the hydraulic pressure at the exit from the master cylinder (16) are measured using sensors (28 and 30), and wherein output signals provided by said sensors are processed by data-processing means (32) so as to compute a pressure difference ($\Delta P$), proportional to the instantaneous amplification provided by the servomotor and, if required, an instantaneous value of the pressure (Prc) inside the working chamber (26) of the servomotor.

10 Claims, 2 Drawing Sheets

METHOD FOR DETERMINING A BRAKE BOOSTER AMPLIFICATION

This invention relates to a process and a device for determining the instantaneous value of the amplification provided by a pneumatic-assistance servomotor in a braking device, in particular for a motor vehicle.

In a well-known manner in the art, a pneumatic-assistance servomotor comprises a negative-pressure chamber, connected to a negative-pressure source, e.g. the inlet manifold of an internal-combustion engine, and a working chamber which may be supplied with atmospheric-pressure air selectively, these chambers being separated by a moving partition wall bearing an axial piston.

A brake pedal, actuated by the vehicle driver, is connected through a control rod to the axial piston of the servomotor, which piston is, in turn, connected to an actuating rod of a hydraulic master cylinder of the braking device. At rest, the working chamber of the servomotor is connected with the negative-pressure chamber and separated from the ambient atmosphere. When the driver depresses the brake pedal, the working chamber is separated from the negative-pressure chamber and then connected to the atmospheric-pressure ambient air, so that the pressure gradually increases inside such chamber till it is equal to the atmospheric pressure. The braking force, which is applied by the driver to the brake pedal, is amplified by the servomotor, proportionally to the pressure difference between the chambers of the servomotor, and the amplification reaches its maximum value when the pressure within the working chamber is equal to the atmospheric pressure, which means that the servomotor is in its saturation state.

The knowledge of the values of the pressures or of the vacuum levels in the chambers of the servomotor makes it possible both to determine and to monitor the amplification provided by the servomotor, as well as to check the condition of the latter, but it requires the fitting of pressure sensors inside both chambers of the servomotor, which is quite a drawback in that it may be somewhat difficult to position a sensor within the working chamber and to connect it to data-processing means.

Therefore an object of this invention consists, in particular, in avoiding such a drawback.

To this end, the invention deals with a process and a device which make it possible to determine the amplification provided by a servomotor, yet without either requiring a pressure sensor inside the working chamber of the servomotor, or the direct measurement of the pressure prevailing within said chamber.

Therefore, the present invention provides a process for the determination of the instantaneous value of the amplification provided by a pneumatic-assistance servomotor in a braking device for a motor vehicle, wherein the servomotor comprises a negative-pressure chamber and a working chamber, which are separated by a moving partition wall bearing a piston for the actuation of a hydraulic master cylinder of the braking device, said amplification being proportional to the pressure difference between the chambers of the servomotor, and wherein said process comprises measurements of the pneumatic pressure in the servomotor and of the hydraulic pressure at the exit from the master cylinder, characterised in that it consists in:

making use of the characteristic saturation curve of the servomotor, such curve consisting of all the operating points for which the pressure inside the working chamber is equal to the atmospheric pressure, and being represented by a line segment in an orthonormal plot of axes Pfc, Pmc, where Pfc is the relative vacuum level in the negative-pressure chamber of the servomotor, whereas Pmc stands for the hydraulic pressure at the exit from the master cylinder;

measuring the instantaneous values Pmci of the hydraulic pressure at the exit from the master cylinder, and Pfci of the relative vacuum level in the negative-pressure chamber of the servomotor;

determining, on said saturation curve, in the course of a braking operation, the point Ps the coordinate of which, on the axis Pfc, is the measured instantaneous value of said vacuum level;

determining the coordinate Pmcs of the point Ps on the axis Pmc;

and, if the measured instantaneous value Pmci is lower than the coordinate Pmcs of the point Ps, in taking, as the pressure difference ΔP, the measured instantaneous value Pmci of the pressure at the exit from the master cylinder, multiplied by a constant, or the coordinate, on the axis Pfc, of the point on said saturation curve, the other coordinate of which is equal to Pmci;

and, if the measured instantaneous value Pmci is higher than or equal to the coordinate Pmcs of the point Ps, in taking, as the pressure difference ΔP, the measured value Pfci of the relative vacuum level in the negative-pressure chamber of the servomotor.

Therefore, the invention requires only one pneumatic-pressure sensor, which is fitted e.g. on a stationary wall of the negative-pressure chamber of the servomotor and which outputs an instantaneous measure of the pressure or, more specifically, of the relative vacuum level in the negative-pressure chamber, such measure being combined with the measure of the hydraulic pressure at the exit from the master cylinder for the calculation of an instantaneous value of the pressure difference between the chambers of the servomotor and hence of the amplification, which is provided by the servomotor.

Thanks to such knowledge of the value of the amplification, as provided by the servomotor, more especially, a servomotor of a conventional type may be replaced by a smaller-size servomotor which is less powerful but much less bulky than the servomotor of a conventional type, and which amplifies the force exerted on the brake pedal up to the saturation state, after which, if necessary, the amplification is further increased by means of a pump or similar, by adjusting the amplification as provided by the pump initially, to the maximum amplification provided by the servomotor, so that the driver will not feel any change at all when the pump or similar starts supplementing the amplification provided by the servomotor.

The process according to the present invention also consists in determining, using computation, the pressure inside the working chamber of the servomotor on the basis of the determined value of the pressure difference between both chambers, and in monitoring the changes of said pressure so as to detect a possible fault or failure in the servomotor.

The invention also provides a device for the implementation of the above-described process, such device being characterised in that it comprises detecting and measuring means for the pressure inside the negative-pressure chamber of the servomotor, detecting and measuring means for the hydraulic pressure at the exit from the master cylinder, and data-processing means, which receive the output signals from the above-mentioned detecting and measuring means, and which are programmed so as to determine, on the saturation curve of the servomotor, in the course of a braking operation, the point Ps and the coordinate Pmcs of said point on the axis Pmc, and so as to compare the measured instantaneous value Pmci with the coordinate Pmcs and, depending on the result of such comparison, to take, as the pressure difference ΔP, either the measured value Pmci, multiplied by a constant, or the measured value Pfci, respectively, the working chamber of the servomotor being devoid of pressure-detecting and measuring means.

In an advantageous manner, the data-processing means are also programmed so as to determine, by computation, the instantaneous value of the pressure inside the working chamber of the servomotor, on the basis of the pressure difference between both chambers, and of the measured instantaneous value Pfci of the vacuum level inside the negative-pressure chamber.

Besides and most advantageously, these data-processing means are programmed so as to control means, such as a pump or similar, intended to increase the hydraulic pressure in the braking circuit, when the maximum amplification, provided by the servomotor, is insufficient.

These, as well as other features, characteristics and advantages of the present invention will be more apparent from the following detailed description, by way of example, when taken in conjunction with the accompanying drawings, in which.

Figure 1:
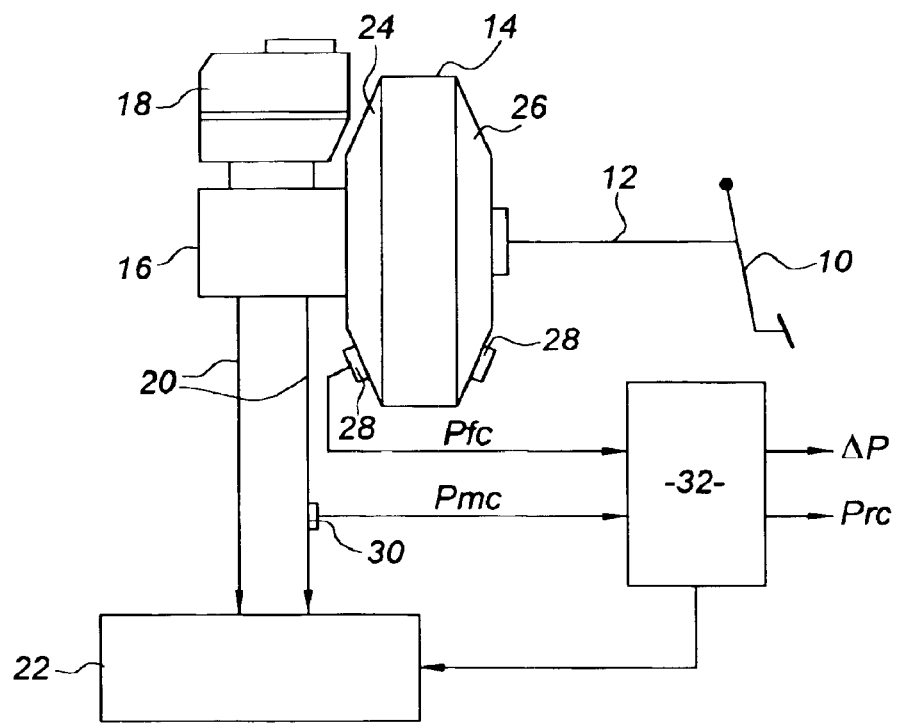
FIG. 1 is a partial schematic view of a braking device, comprising a device according to the present invention.

The braking device intended for a motor vehicle, as diagrammatically shown in FIG. 1, comprises a brake pedal 10, connected through a control rod 12 to an axial piston of a pneumatic-assistance servomotor 14, for the control of a hydraulic master cylinder 16, which is supplied with brake fluid by a fluid tank 18, and the outlet pipes 20 of which are connected to a wheel-braking circuit 22.

Quite conventionally, the servomotor 14 comprises a front chamber or negative-pressure chamber 24, which is connected to a negative-pressure source, such as the inlet manifold of the internal-combustion engine of the vehicle, and a rear chamber or working chamber 26, which is selectively interconnected with the negative-pressure chamber 24, or connected to the atmospheric-pressure ambient air, both chambers being separated, in an airtight manner, by a moving partition wall, the middle part of which bears the axial piston of the servomotor 14, and this piston acts, in turn, on the primary piston of the master cylinder 16, through a reaction means (not shown).

A pressure sensor 28 of some adequate type is fitted on a stationary wall of the negative-pressure chamber 24 so as to detect and measure the pressure prevailing inside such chamber, and a hydraulic-pressure sensor 30 of some adequate type is also provided on an outlet pipe 20 of the master cylinder 16 in order to detect and measure the output hydraulic pressure of the master cylinder. The sensors 28 and 30 output signals, namely Pfc and Pmc respectively, which are applied to inputs of data-processing means 32, programmed so as to provide the values of the pressure difference ΔP between the chambers 24 and 26 of the servomotor 14, and of the pressure Prc inside the working chamber 26.

In an advantageous manner, the data-processing means 32 are also programmed to control, if necessary, means intended to increase the hydraulic pressure in the braking circuit 22, such means being, for instance, a pump or similar, which may form part of a circuit of the ABS or ESP type.

In operation, when the driver depresses the brake pedal 10, the working chamber 26, which was connected with the negative-pressure chamber 24, is separated from the latter and then connected to the atmospheric-pressure ambient air, with the result that the pressure progressively increases in the working chamber 26, whereas the value of the pressure, prevailing inside the chamber 24, remains lower than that of the atmospheric pressure and is, for instance, equal to the negative-pressure in the inlet manifold of the internal-combustion engine of the vehicle.

The pressure difference between the chambers 24 and 26 of the servomotor 14 amplifies the force, which is applied to the control rod 12, with the result that the force, applied to the primary piston of the master cylinder 16, is equal to the force exerted on the control rod 12, multiplied by an amplification coefficient, which is in turn equal to the pressure difference ΔP between the chambers of the servomotor, the latter value being multiplied by a constant. When the pressure inside the working chamber 26 reaches the atmospheric pressure, the amplification through the servomotor is at its maximum value and accordingly the servomotor is said to have reached its saturation state.

Figure 2:
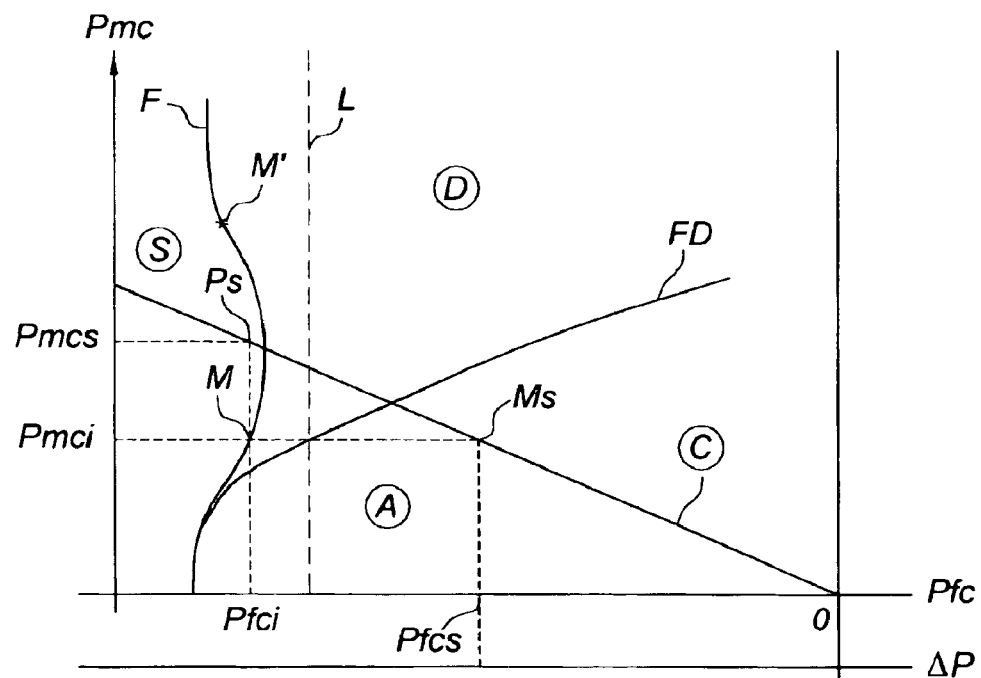
FIG. 2 is a graph showing the characteristic saturation curve of a pneumatic-assistance servomotor, and a braking curve.

In FIG. 2, the curve C is the characteristic saturation curve of the servomotor 14 and it consists of all the saturation points of the servomotor, in an orthonormal plot of axes Pfc and Pmc, where Pfc is the pressure or, more correctly, the relative vacuum level in the negative-pressure chamber 24, such vacuum level being equal to zero when the pressure inside the chamber 24 is equal to the atmospheric pressure, and where Pmc is the hydraulic pressure at the exit from the master cylinder 16.

According to this plot Pfc, Pmc, it is obvious that the saturation curve C of the servomotor 14 is a line segment corresponding to the equation $Pmc = \alpha \cdot Pfc$.

In the graph of FIG. 2, the curve F is a normal braking curve, and the area A, situated under the curve C, is an area in which the servomotor 14 carries out the amplification; the area S, situated above the curve C, is an area in which the servomotor 14 operates in its saturation state; the area D on the right-hand side of the dotted vertical line L is a failure area concerning the servomotor; and the curve FD is a braking curve, in the event of a leakage between the chambers 24, 26 of the servomotor.

Now, supposing a point M on the normal braking curve F, such point M is located under the saturation curve C and in the amplification area A. The coordinates of said point M are Pfci, Pmci and they are outputted by the sensors 28 and 30.

In order to determine the pressure difference ΔP between the chambers 24 and 26, the case in which the point in question is located on the saturation curve C for the same input force, applied to the brake pedal, is taken into consideration and such point on the saturation curve corresponds to a pressure difference ΔP which is equal to the abscissa of said point on the axis Pfc, owing to the fact that the saturation state is reached when the pressure inside the working chamber 26 is equal to the atmospheric pressure and, accordingly, has a null relative value.

Since for the same input force, the same output hydraulic pressure Pmc of the master cylinder is obtained, the point to be found on the curve C is the point Ms, which has the same ordinate Pmci as the point M on the braking curve. And the abscissa Pfcs of said point Ms represents the pressure difference ΔP between the chambers 24, 26 at point M.

This pressure difference ΔP at point M may also be expressed as Pmci/α.

When the point taken into consideration on the braking curve F is located at M', i.e. above the saturation curve C, the amplification is the same as if the point were on the saturation curve C, and therefore the pressure difference ΔP between the chambers is equal to the abscissa Pfc of the point M'.

So as to check whether a point on the braking curve F is located under or above the saturation curve C, the point Ps is taken in consideration, which has the same abscissa Pfci as that measured for the point M in question, the ordinate Pmcs, corresponding to α.Pfci, of such point is determined and a check confirms whether the measured ordinate Pmci of the point M is higher or lower than Pmcs.

In the case of a failure in the servomotor 14, e.g. a leakage between the chambers 24 and 26, the braking curve resulting from the depression of the brake pedal 10, is the curve FD which indicates clearly that the relative pressure within the chamber 24 is tending towards zero in the course of the braking operation. The failure area D is situated, in the graph of FIG. 2, to the right-hand side of a line L, parallel to the axis Pmc.

Figure 3:
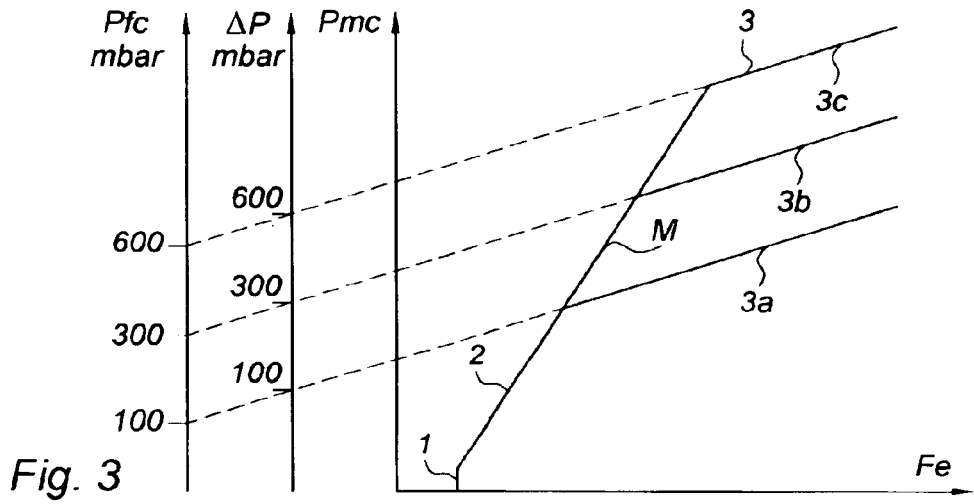
FIG. 3 is a graph in which the change of the output hydraulic pressure of the master cylinder is plotted versus the force exerted on the pedal.

FIG. 3 shows the change of the output hydraulic pressure Pmc of the master cylinder 16, plotted versus the input force Fe exerted on the brake pedal 10. The curve Pmc=f(Fe) is known and determined through the dimensioning of the braking device. Such curve comprises a first portion 1, corresponding to the jump phase, a second portion 2 representing the amplification by the servomotor, and a third portion 3, which corresponds to the operation when the servomotor 14 is saturated. As regards this third portion 3 of the curve, the amplification of the input force Fe is due to the master cylinder 16 and it actually corresponds to a section ratio which is different from 1.

Owing to the fact that, on saturation, the pressure difference ΔP between the chambers of the servomotor is equal to the relative pressure inside the negative-pressure chamber 24, the values of this pressure difference ΔP and of this relative pressure Pfc clearly stand out from FIG. 3, in that they are plotted along two vertical axes, parallel to the ordinate axis Pmc, using broken lines drawn in continuation of the third portion 3 of the curve Pmc.

The three parallel curve portions 3a, 3b and 3c are obtained for three different values of ΔP, and consequently of Pfc, for instance equal to 100, 300 and 600 mbars respectively.

Along Pmc, the slope of the portion 2 is known, and this also holds true for the coordinates of the transition point between the portions 1 and 2 of the curve. At such point, ΔP is also known as being equal to zero. The total amplification at a point M on the portion 2 of the curve is equal to the product of the amplification provided by the servomotor and of the amplification provided by the master cylinder. This total amplification can be computed from the measured coordinate Pmci of the point M, using the following formula:

$$K(M) = a.Pmci/(Pmci - P1 + a.F1)$$

where P1 and F1 are the coordinates of the transition point between the portions 1 and 2 of the curve Pmc in FIG. 3, and a is the slope of the portion 2 of the curve.

Figure 4:
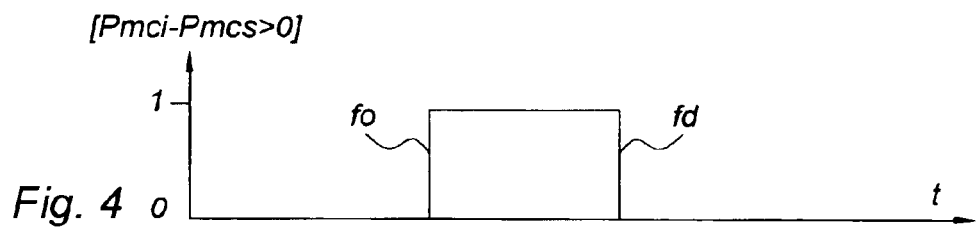
FIG. 4 represents the change of a binary value, corresponding to the saturation of the servomotor, as a function of time.

The above-mentioned formula is valid for the portion 2 of the curve, which means that a check must be made beforehand as to whether the servomotor has reached its saturation point. Such check may be merely based on the relationship Pmci−Pmcs>0, which a ZERO is assigned to when such relationship is false, and which is ONE when this relationship is true, which results in a step or square curve, in terms of time as illustrated in FIG. 4. The detection of the rising edge f0 of said curve corresponds to the reaching of the saturation state during a braking operation, and the detection of the falling edge fd corresponds to the saturation point crossing, when the brake pedal is released.

Figure 5:
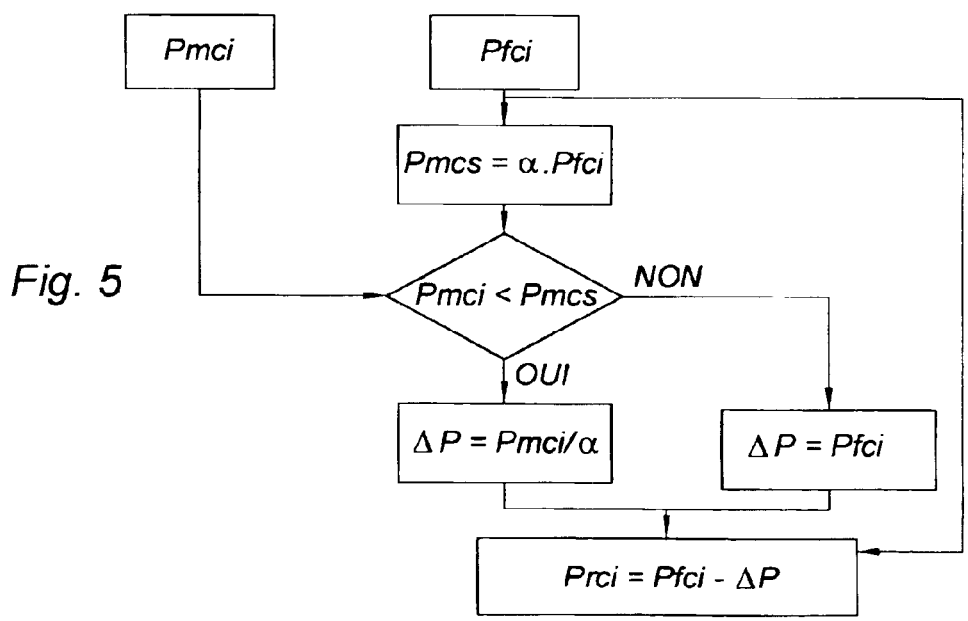
FIG. 5 is a flowchart of the main steps of the process according to this invention.

FIG. 5 shows a flowchart, in which the main steps of the process according to the invention are represented diagrammatically.

Knowing the saturation curve C of the servomotor, the instantaneous values Pfci and Pmci are measured using the sensors 28 and 30, the coordinate Pmcs of the point Ps is determined by means of the relationship α.Pfci, a check is made as to whether Pmci is lower than Pmcs or not. If it is the case, the pressure difference ΔP between the chambers is obtained through the relationship ΔP=Pmci/α (or ΔP=Pfcs), whereas in the negative, ΔP is obtained using the relationship ΔP=Pfci.

ΔP and Pfci being known by now, the pressure inside the working chamber 26 of the servomotor can be computed using the relationship Prci=Pfci−ΔP.

The knowledge of the pressure inside the working chamber 26 makes it possible to check the condition of the servomotor 14, as well as to monitor its performance. A leakage between the chambers of the servomotor can also be directly detected from Pfci, when the measured instantaneous value of the vacuum level in the negative-pressure chamber 24 exceeds, in the course of the braking operation, a value which is defined by the abscissa of the line L in FIG. 2.

If a failure is detected in the servomotor 14, an alarm signal is outputted so as to draw the driver's attention to such a malfunction, and/or a backup/emergency system is actuated, and/or a complemental amplification means is activated.

The knowledge of the instantaneous amplification provided by the servomotor 14 or of the total instantaneous amplification (the product of the instantaneous amplification provided by the servomotor and of the amplification provided by the master cylinder 16) makes it possible, when the saturation curve C of the servomotor is reached on a braking operation, to proceed with this amplification from the value which has been obtained on the curve C, in that a means intended to increase the pressure in the braking circuit is activated and adjusted, such a means being for instance a hydraulic pump in a ABS circuit or similar. Thus, there are no discontinuities in the amplification of the force applied to the brake pedal, and the changeover from an amplification means to another one is not perceptible to the driver.

Thanks to the above-described design, a smaller-size servomotor 14 can be substituted for a more bulky conventional servomotor, which results in a reduced room requirement for the whole braking device. For instance, a smaller-size servomotor 14 having a saturation point at 40 bars may be used, whereas a servomotor of a conventional type exhibits, e.g., a saturation point around 80–90 bars.

We claim:

1. A process for the determination of the instantaneous value of the amplification provided by a pneumatic-assistance servomotor in a braking device for a motor vehicle, wherein the servomotor (14) comprises a negative-pressure chamber (24) and a working chamber (26), which are separated by a moving partition wall bearing a piston for the actuation of a hydraulic master cylinder (16) of the braking device, said instantaneous amplification being proportional to the pressure difference, ($\Delta P$) between the chambers of the servomotor, and wherein said process comprises measurements of the pneumatic pressure in the servomotor and of the hydraulic pressure at the exit from the master cylinder (16), characterised in that it consists in:

making use of the characteristic saturation curve (C) of the servomotor (14), such curve consisting of all the operating points for which the pressure inside the working chamber (26) is equal to the atmospheric pressure, and being represented by a line segment in an orthonormal plot of axes (Pfc, Pmc), where Pfc is the relative vacuum level in the negative-pressure chamber (24) of the servomotor, whereas Pmc stands for the hydraulic pressure at the exit from the master cylinder (16);

measuring the instantaneous values (Pmci) of the hydraulic pressure at the exit from the master cylinder (16), and (Pfci) of the relative vacuum level (Pfc) in the negative-pressure chamber of the servomotor;

determining, on said characteristic saturation curve (C), in the course of a braking operation, the point (Ps) the coordinate of which, on the axis (Pfc), is the measured instantaneous value (Pfci) of said vacuum level;

determining the coordinate (Pmcs) of the point (Ps) on the axis (Pmc);

and, if the measured instantaneous value (Pmci) is lower than the coordinate (Pmcs), in taking, as the pressure difference ($\Delta P$), the coordinate, on the axis (Pfc), of the point on said saturation curve (C), the other coordinate of which is equal to (Pmci), or in determining the pressure difference ($\Delta P$) from the measured instantaneous value (Pmci) of the pressure at the exit from the master cylinder, multiplied by a constant;

and, if the measured instantaneous value (Pmci) is higher than or equal to the coordinate (Pmcs) of the point (Ps), in taking, as the pressure difference ($\Delta P$), the measured value (Pfci) of the relative vacuum level in the negative-pressure chamber (24) of the servomotor (14).

2. The process according to claim 1, characterised in that said constant is equal to the inverse of the slope ($\alpha$) of said saturation curve (C) in the plot (Pfc, Pmc).

3. The process according to claim 1, characterised in that it consists in using a smaller-size servomotor (14), in amplifying the force (Fe), exerted on the brake pedal, by means of the servomotor (14) until such time as the latter reaches the saturation state, and then in further amplifying the hydraulic pressure at the exit from the master cylinder using another pressure-amplifying means, such as a pump or similar, and in activating and adjusting said pressure-amplifying means in such a way that it provides an initial amplification, which is substantially equal to that provided by the servomotor (14) on saturation.

4. The process according to claim 1, characterised in that it consists in assigning a binary value to the difference (Pmci−Pmcs), said value being equal to 0 when said difference is lower than 0, and equal to 1 when said difference is higher than 0, and in monitoring the change of state of said binary value so as to determine the saturation points of the servomotor during a braking operation and also when the brake pedal is released.

5. The process according to claim 4, characterised in that it consists in determining the instantaneous pressure (Prci) inside the working chamber (26) of the servomotor, using computation, on the basis of the determined value of the pressure difference ($\Delta P$), and in monitoring the changes said pressure so as to detect a possible failure in the servomotor.

6. The process according to claim 5, characterised in that the pressure, prevailing inside the working chamber (26) of the servomotor is determined by means of the relationship Prci=Pfci−$\Delta P$.

7. The process according to claim 6, characterised in that it consists in detecting a possible failure in the servomotor (14), from the trend of the measured instantaneous pressure (Pfci) inside the negative-pressure chamber (24) in the course of a braking operation beyond a predetermined limit value.

8. The process according to claim 7 characterised by detecting and measuring means (28, 30) for the pressure inside the negative-pressure chamber (24) of the servomotor (14) and for the hydraulic pressure at the exit from the master cylinder (16), and data-processing means (32), which receive the output signals from said detecting and measuring means (28, 30) and which are programmed so as to determine, on the saturation curve (C) of the servomotor (14), in the course of a braking operation, the point (Ps) and its coordinate (Pmcs) on the axis (Pmc), and so as to compare the measured instantaneous value (Pmci) with the coordinate (Pmcs) and, depending on the result of such comparison, to determine the pressure difference ($\Delta P$) using the product of the measured value (Pmci), multiplied by a constant, or using the measured instantaneous value (Pfci) of the vacuum level inside the negative-pressure chamber (24), respectively, wherein the working chamber (26) of the servomotor (14) is devoid of pressure-detecting and measuring means.

9. The process according to claim 8, characterised in that the data-processing means (32) are programmed so as to determine, by computation, the instantaneous value of the pressure (Prci) inside the working chamber (26) of the servomotor.

10. The process according to claim 8, characterised in that the data-processing means are programmed so as to control means, such as a pump or similar, intended to amplify the hydraulic pressure in the braking circuit (22), when the maximum amplification, provided by the servomotor (14), is insufficient.

\* \* \* \* \*